(12) United States Patent
Grooters

(10) Patent No.: US 6,931,593 B1
(45) Date of Patent: Aug. 16, 2005

(54) AUTOMATIC CHANNEL GENERATION FOR HOME NETWORK SYSTEMS

(75) Inventor: Brandon A. Grooters, Watauga, TX (US)

(73) Assignee: Gateway Inc., Irvine, CA (US)

( * ) Notice: Subject to any disclaimer, the term of this patent is extended or adjusted under 35 U.S.C. 154(b) by 0 days.

(21) Appl. No.: 09/575,767

(22) Filed: May 22, 2000

(51) Int. Cl.[7] .............................................. G06F 17/00
(52) U.S. Cl. ...................... 715/717; 715/737
(58) Field of Search ................ 345/730, 733, 345/734, 735, 736, 737, 738, 739, 740, 970; 715/716–719, 715/727, 733–738, 740, 744, 760, 764, 765, 715/810; 709/208, 217; 710/1, 8–19

(56) References Cited

U.S. PATENT DOCUMENTS

| | | | |
|---|---|---|---|
| 5,657,461 A | 8/1997 | Harkins et al. | |
| 5,724,355 A | 3/1998 | Bruno et al. ................ | 370/401 |
| 5,790,935 A | 8/1998 | Payton ....................... | 455/5.1 |
| 5,793,366 A * | 8/1998 | Mano et al. ................ | 345/839 |
| 5,828,839 A | 10/1998 | Moncreiff | |
| 5,872,588 A | 2/1999 | Aras et al. .................... | 348/1 |
| 5,905,865 A | 5/1999 | Palmer et al. | |
| 5,945,988 A | 8/1999 | Williams et al. ............ | 345/327 |
| 5,956,487 A | 9/1999 | Venkatraman et al. | |
| 5,961,603 A | 10/1999 | Kunkel et al. .............. | 709/229 |
| 5,964,839 A | 10/1999 | Johnson et al. ............ | 709/224 |
| 6,104,334 A * | 8/2000 | Allport ....................... | 341/175 |
| 6,141,702 A * | 10/2000 | Ludtke et al. ................ | 710/5 |
| 6,160,796 A * | 12/2000 | Zou ........................... | 370/257 |
| 6,288,716 B1 * | 9/2001 | Humpleman et al. ....... | 345/733 |
| 6,304,523 B1 * | 10/2001 | Jones et al. ............... | 707/104.1 |
| 6,430,629 B1 * | 8/2002 | Smyers ....................... | 710/15 |

OTHER PUBLICATIONS

See Many Files at Once With Thumbnail View, by Scott Dunn; PC World, Dec. 1999, p. 304.
Today on MSN, http://www.msn.com/, Oct. 18, 1999 at 2:53 p.m.
Welcome to Entrypoint!, http://www.pointcast.com/, Oct. 12, 1999 at 2:36 p.m.
Entrypoint help/FAQs, http://www.entrypoint.com/help/help_pcewallet.htm, Oct. 12, 1999 at 2:37 p.m.
WebTools Customize, http://www.webtools.com/customize/step1, Oct. 18, 1999 at 11:19 a.m.
Intel PC Camera Pro, http://www.intel.com/pccamera/software/buildhom.htm, Oct. 18, 1999 at 8:48 a.m.

* cited by examiner

Primary Examiner—John Cabeca
Assistant Examiner—Brian J. Detwiler
(74) Attorney, Agent, or Firm—Chad Swantz; Suiter West Swantz

(57) ABSTRACT

An automatic channel generator and a method for generating a channel based upon the utilization of a device and activities occurring on the device. A device is connected to a local network hub, which may be integral to an information appliance. The information appliance is capable of searching the Internet for data associated with media being delivered by a device on the local network system. The aggregates of content can be collected automatically, and its presentation may be customized by a user.

31 Claims, 9 Drawing Sheets

AUTOMATIC CHANNEL GENERATION FOR HOME NETWORK SYSTEMS

FIELD OF THE INVENTION

The present invention relates generally to generation of content channels, and more specifically to the automatic generation of content channels based upon the audiovisual media being delivered on a network system.

BACKGROUND OF THE INVENTION

Home entertainment systems and home control systems are well known in the art. Typically, a home entertainment system includes a television, a video playing device such as a video cassette recorder (VCR) or a digital video disc (DVD) player, a radio tuner, a compact disc (CD) player, a set of speakers, and a means for controlling the functionality of the home entertainment system. Furthermore, a home control system may also be incorporated into a home network, and include control of a security device and various light fixtures.

In both a typical home entertainment system and a home control system, each device of the respective systems works independently of the other devices and may be related to the other only in that each are connected to a central controller. Thus, if a consumer desired to listen to music played on a CD player, then the user enables the CD function of the controller, and places a particular CD into the CD player. However, other devices included within the home entertainment system would neither be aware of, nor be in communication with, these other devices.

Electronic Program Guides (EPGs) are available through various cable companies and satellite providers. EPGs provide users with the ability to determine when a particular program is scheduled to air, along with information regarding the program. However, although EPGs may provide information regarding programs being broadcast by a cable or satellite company, they are unable to provide information regarding the availability of certain CDs, DVDs, videotapes, radio stations, or the like, that may be accessible by the home network. It would be beneficial if a user could gain access to information regarding the various sources of media available on the user's home network.

The ability to retrieve and collect information from a worldwide network is also well known. For example, if a consumer wishes to find information regarding an artist from a particular CD, then the user can access the Internet and retrieve such information. This information may include other works produced by the artist, as well as various options for purchasing such works. However, it may be inconvenient for a user to access the Internet every time the user desired additional information regarding an artist from a particular CD, or an actor from a particular movie. Thus, making such information automatically available to the user would be a desirable feature.

Accordingly, it would be advantageous to provide an apparatus and method for automatically generating content channels based upon the audiovisual media being delivered on a particular device of a local network system. Further, it would be advantageous to provide an apparatus and method for automatically generating channels relating to the specific devices connected to a local network system. Yet another desirable advantage would be to allow a user to modify and organize the channels in conformity with the user's preferences. These and other features and advantages are also made available by the present invention.

SUMMARY OF THE INVENTION

Accordingly, the present invention is directed to a novel apparatus and method for automatically generating content channels associated with audiovisual media delivered on devices of a local network system. The apparatus and method includes integration of an information appliance, such as a personal computer, and various devices, into a local network system. The information appliance and network are designed to interact with the various devices being connected to, and the various sources of audiovisual media being played on, the network. The user interface of the present invention allows for the user to modify and organize the channels based upon the user's preferences.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to a presently preferred embodiment of the invention, an example of which is illustrated in the accompanying drawings.

Figure 1:
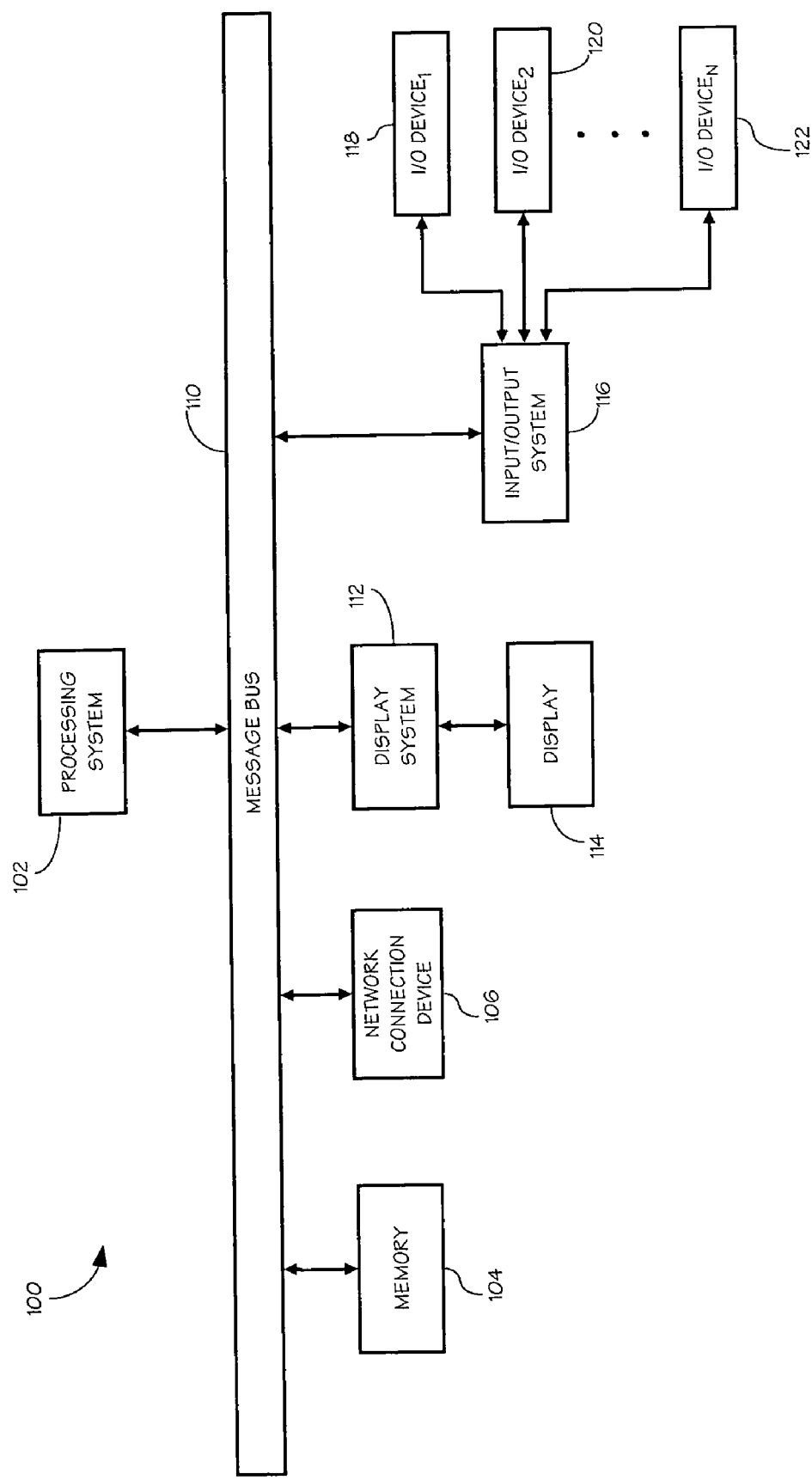
FIG. 1 is a block diagram of a preferred embodiment of an information appliance of the present invention.

Referring now to FIG. 1, a hardware system in accordance with the present invention is shown. The hardware system shown in FIG. 1 is generally representative of a preferred hardware architecture of an information appliance 100 of the present invention. A controller, for example, a processing system 102, controls the information appliance 100. The processing system 102 includes a central processing unit such as a microprocessor or microcontroller for executing programs, performing data manipulations and controlling the tasks of the information appliance 100. Communication with the processing system 102 may be implemented through a message or system bus 110 for transferring information among the devices of the information appliance 100. The system bus 110 may include a data channel for facilitating information transfer between storage and other peripheral devices of the information appliance 100. The system bus 110 further provides the set of signals required for communication with processing system 102 including a data bus, address bus, and control bus. The system bus 110 may comprise any state of the art bus architecture according to promulgated standards, for example industry standard architecture (ISA), extended industry standard architecture (EISA), Micro Channel Architecture (MCA), peripheral device interconnect (PCI) local bus, standards promulgated by the Institute of Electrical and Electronics Engineers (IEEE) including IEEE 488 general-purpose interface bus (GPIB), IEEE 696/S-600, and so on. Furthermore, the system bus 110 may be compliant with any promulgated industry standard. For example, the system bus 110 may be designed in compliance with any of the following bus architectures: Industry Standard Architecture (ISA), Extended Industry Standard Architecture (EISA), Micro Channel Architecture, Peripheral Device Interconnect (PCI), Universal Serial Bus (USB), Access bus, IEEE P6394, Apple Desktop Bus (ADB), Concentration Highway Interface (CHI), Fire Wire, Geo Port, or Small Computer Systems Interface (SCSI), as examples.

Additionally, the information appliance 100 includes a memory 104. In one embodiment, memory 104 is provided on SIMMs (Single In-line Memory Modules), while in another embodiment, memory 104 is provided on DIMMs (Dual In-line Memory Modules), each of which plugs into suitable sockets provided on a motherboard holding many of the other devices shown in FIG. 1. Memory 104 includes standard DRAM (Dynamic Random-Access Memory), EDO (Extended Data Out) DRAM, SDRAM (Synchronous DRAM), or other suitable memory technology. Memory 104 may also include auxiliary memory to provide storage of instructions and data that are loaded into the memory 104 before execution. Auxiliary memory may include semiconductor based memory such as read-only memory (ROM), programmable read-only memory (PROM) erasable programmable read-only memory (EPROM), electrically erasable read-only memory (EEPROM), or flash memory (block oriented memory similar to EEPROM).

The information appliance 100 further includes a network connection device or a network interface 106. The network interface 106 communicates between the information appliance 100 and a remote device, such as external devices, networks, information sources, or host systems that administer a plurality of information appliances. For example, host systems such as a server or information handling system, may run software controlling the information appliance 100, serve as storage for an information appliance 100, or coordinate software running separately on each information appliance 100. The network interface 106 may provide or receive analog, digital, or radio frequency data. The network interface system 106 preferably implements industry promulgated architecture standards, including Recommended Standard 232 (RS-232) promulgated by the Electrical Industries Association, Infrared Data Association (IrDA) standards, Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, 802.66 for wireless networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and Universal Serial Bus (USB), as examples. For example, the network interface system 106 may comprise a network adapter, a serial port, parallel port, printer adapter, modem, universal asynchronous receiver-transmitter (UART) port, etc., or use various wireless technologies or links such as an infrared port, radio-frequency (RF) communications adapter, infrared transducers, or RF modem.

The information appliance 100 further includes a display system 112 for connecting to a display device 114. The display system 112 may comprise a video display adapter having all of the devices for driving the display device, including video random access memory (VRAM), buffer, and graphics engine as desired. The display device 114 may comprise a liquid-crystal display (LCD), or may comprise alternative type of display technologies, such as a light-emitting diode (LED) display, gas or plasma display, or employ flat-screen technology.

An information appliance 100 may further include an input/output (I/O) system 116 for =connecting to one or more/devices 118, 120, and up to N number of I/O devices 122. Input/output system 116 may comprise one or more controllers or adapters for providing interface functions between one or more of I/O devices 118–122. For example, input/output system 116 may comprise a serial port, parallel port, network adapter, printer adapter, radio-frequency (RF) communications adapter, universal asynchronous receiver-transmitter (UART) port, etc., for interfacing between corresponding I/O devices such as a mouse, joystick, trackball, trackpad, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electroacoustic transducer, microphone, speaker, etc. It should be appreciated that modification or reconfiguration of the information appliance 100 of FIG. 1 by a person of ordinary skill in the art would not depart from the scope or the spirit of the present invention.

Although an exemplary information appliance of the present invention has been described with a certain degree of particularity, it should be recognized that elements thereof may be altered by persons skilled in the art without departing from the spirit and scope of the invention. One of the embodiments of the invention may be implemented as sets of instructions resident in the memory 104 of one or more information appliances configured generally as described in FIG. 1. Until required by the information appliance, the set of instructions may be stored in another readable memory device, for example in a hard disk drive or in a removable memory such as an optical disk for utilization in a CD-ROM drive, a floppy disk for utilization in a floppy disk drive, a floptical disk for utilization in a floptical drive, or a personal computer memory card for utilization in a personal computer card slot. Further, the set of instructions may be stored in the memory of an information handling system and transmitted over a local area network or a wide area network, such as the Internet, when desired by the user. Additionally, the instructions may be transmitted over a network in the form of an applet that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically, or holographically so that the medium carries computer readable information.

Figure 2:
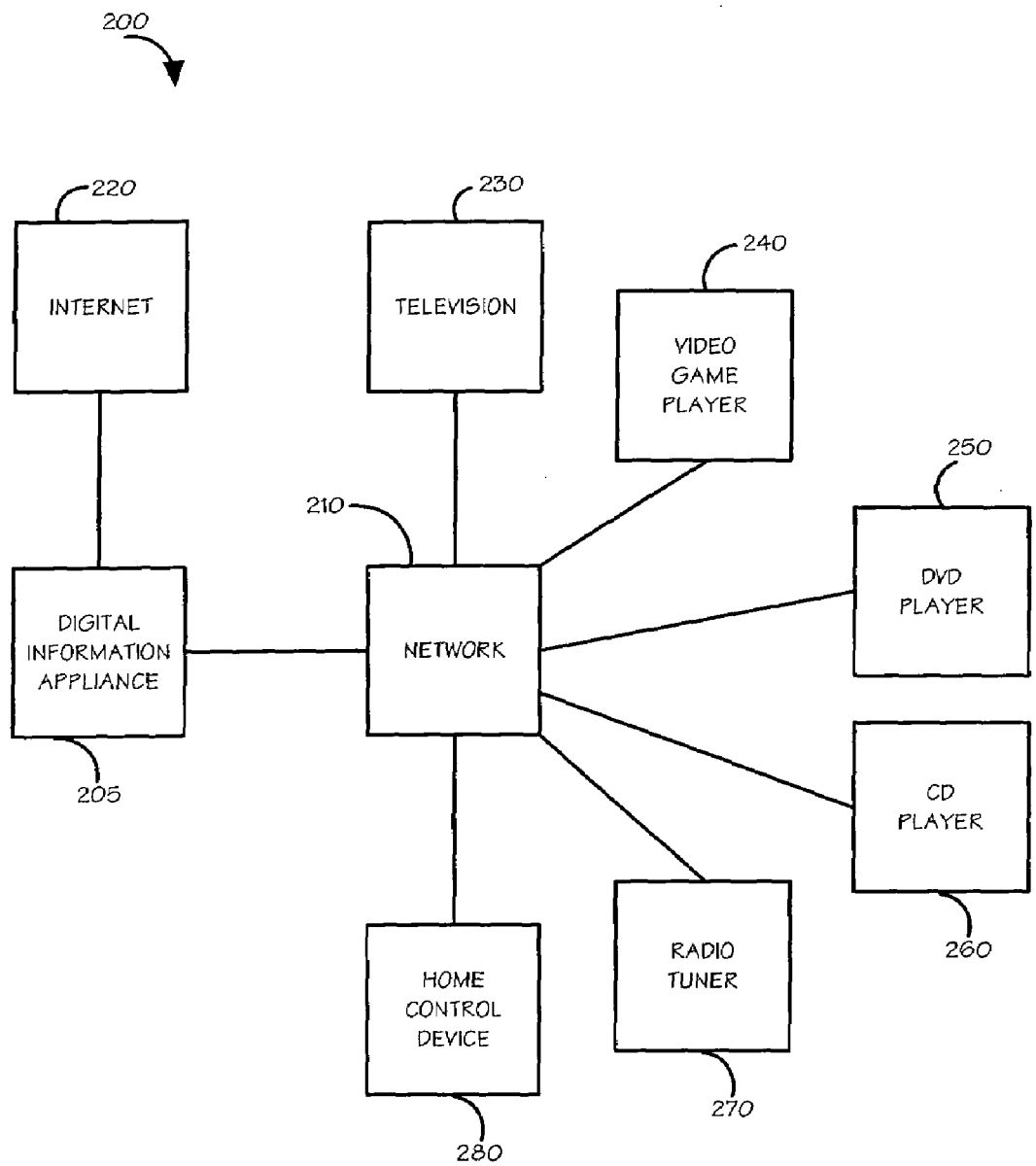
FIG. 2 is a block diagram representing a preferred embodiment of the system of the present invention.

Referring now to FIG. 2, a block diagram representing devices of an exemplary embodiment of the system 200 of the present invention is shown. A network hub or network 210 interconnects an information appliance 205 with various devices. In is understood that in an alternative embodiment, the network hub 210 and the information appliance 205 may be one in the same, and may perform the functions of both elements. In other words, the information appliance may function as the network hub, and the various devices will be connected to the information appliance 205. In another alternative embodiment, the network may be a mere interconnection of HAVi compliant devices, in which case there would be no "physical" network hub. Rather, the network would be comprised of the various devices, wherein each device contributes to the functionality of the network. If a central controller is incorporated, then such a controller would be viewed as the network hub or network 210. Accordingly, the network 210 enables interconnection between a variety of devices. Devices may be operably connected to the network 210. In an exemplary embodiment, a communications link to the Internet 220, a television 230, a video game player 240, a DVD player 250, a CD player 260, a radio tuner 270, and a home control device 280, are all types of devices which may be connected to a network and be utilized in an exemplary embodiment of the present invention. With respect to a television 230, it should be recognized that television broadcasts received by antenna, cable, and satellite may be incorporated within the present invention. The list of devices shown in FIG. 2 connected to a network 210 is not exclusive and other devices may be connected to an exemplary embodiment of the present invention without departing from the scope and spirit of the invention.

Figure 3:
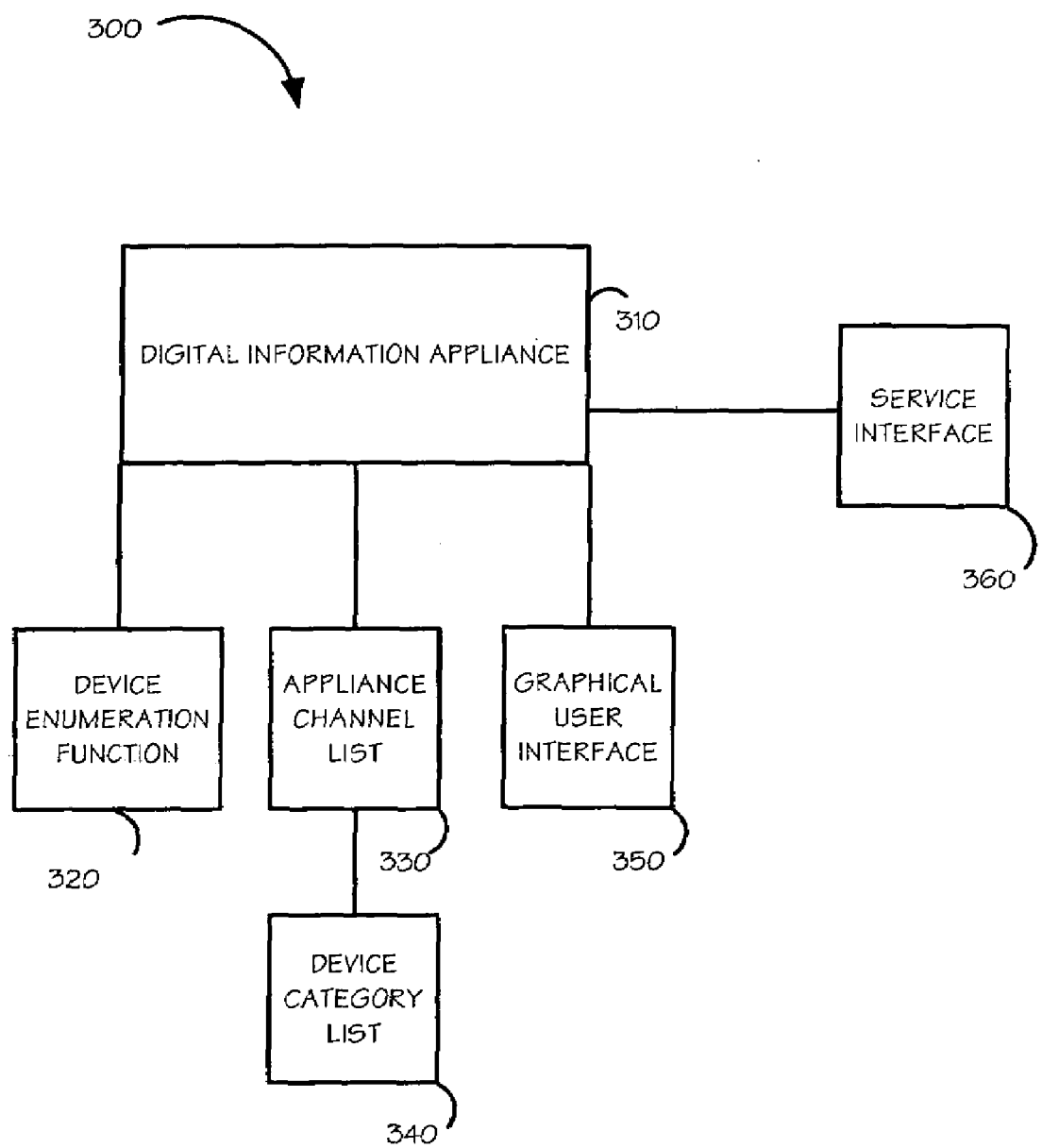
FIG. 3 is a block diagram representing exemplary functions of the present invention managed by an information appliance of the present invention.

Referring now to FIG. 3, an exemplary block diagram representing the functions 300 managed by an information appliance 310 is shown. The information appliance 310 may comprise a device enumeration function 320, an appliance channel list 330 that includes a device category list 340, and a graphical user interface 350. The information appliance 310 may be capable of displaying an appliance channel list 330 of all resources available on the network. The channel list 330 comprises channels representing various devices, and each device channel comprises further sub-channels that provide additional information relating to content available via the device. A service interface 360 may be implemented, similar to HAVi protocol, which provides information regarding the specifications of the device, information about the manufacturer, and maintenance tips for longer durability for the device, to the network. When a channel is created or enhanced, the service interface 360 provides the network with the appropriate information regarding a new device that has been added, or an existing device that has been content modified.

In a preferred embodiment, the information appliance 310 is a personal computer, and a "web browser type" software program, or a "network interface" software program is implemented to provide the user with a pull down menu listing various channels relating to the various sources connected to the information appliance 310 or network, such as an Internet connection or a CD player. Thus, if a user clicked on the "Internet" channel, the various sub-channels presented could include items such as sports, business, shopping, search engines, etc. Within each of these sub-channels could be links to web sites that fall under the various topics, such as links for ESPN.com or CNNSI.com under the "sports" sub-channel. In addition, the user would have additional channels for each of the various devices connected to the network, including channels for a DVD, CD, VCR, cable, video games, etc. Thus, if a user were to purchase a HAVi-compatible radio tuner and connect it to the HAVi-compatible network, the system of the present invention would automatically generate a "radio tuner" channel. In addition, if the user were to manually pre-set a list of favorite radio stations onto the radio tuner, this information would automatically be generated as sub-channels under the "radio tuner" channel on the network interface program. In a further embodiment, if the user is listening to digital music via the "cable" channel, such music is frequently designated with the name of the artist and song. The user could set up parameters on the "cable" channel's "digital music" sub-channel' s "80's music" sub-sub-channel, such that the system would automatically search the Internet for biographical information on the artist, and add a link for purchasing the artist's CD, and place this data as a sub-sub-sub-channel, designated by artist.

Figure 4:
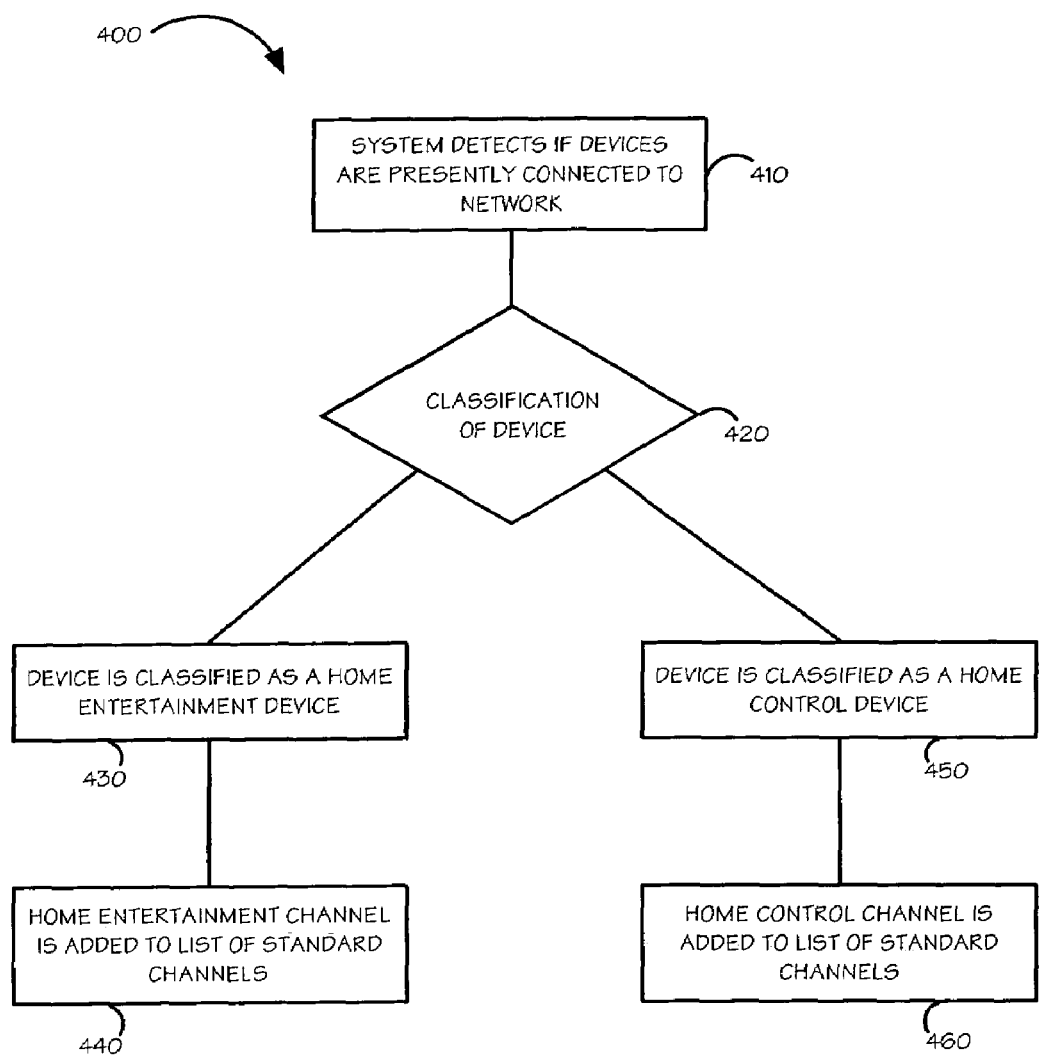
FIG. 4 is a flow chart representing an exemplary process of generating a home entertainment channel and a home control channel.

Referring to FIG. 4, an exemplary flow chart of a process 400 of generating a home entertainment channel and home control channel automatically by the system of the present invention is shown. The system of the present invention must automatically check the devices connected to a network and automatically detect the addition of a new device 410. At this point, the device may be classified 420. If a type of home entertainment device is detected by the information appliance in step 430, a DVD player for example, a home entertainment channel may be created to a list of standard channels available on the information appliance in step 440. Further, if a home control device is detected by the information appliance in step 450, a home control channel may be added to a list of standard channels available on the information appliance in step 460. Examples of home control devices include but are not limited to light fixtures, switches, and home security devices.

Figure 5:
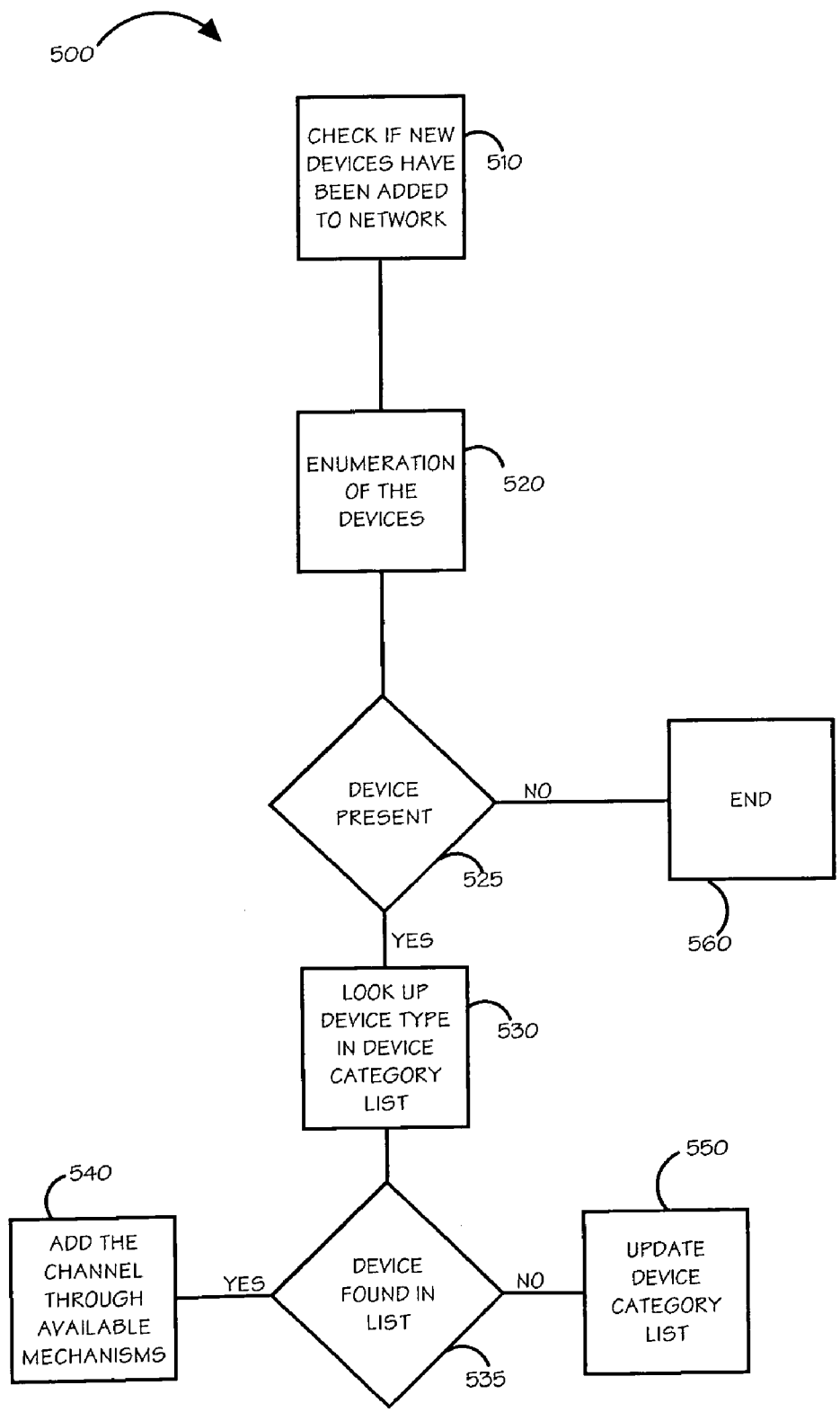
FIG. 5 is a flow chart representing a preferred procedure for generating channels relating to devices connected to a network system.

In FIG. 5, a flow chart representing an exemplary process 500 for creating or modifying channels related to specific devices connected to a local network is shown. A first step 510 may check if new devices have been added to the network. An enumeration of the devices is accomplished by the information appliance in step 520. The system queries if the device is present in step 525. If yes, the system may then look up the device type in the device category list of the information appliance in step 530. The system checks if the device is found within the device category list in step 535. If the device is found in the list, then a channel is added in step 540. If a channel already exists, then the system may be programmed to understand that the device was already connected, and can then check to see if any content relating to the device has been modified. If the device is not found in the device category list, then the category list is updated 550. Then, the next time the flow chart loop is executed, the device will exist in the list and a corresponding channel will be added. If the device is not present in step 525, i.e., no new device has been added, the process is completed at step 560 for the present execution of the flow chart loop.

Figure 6:
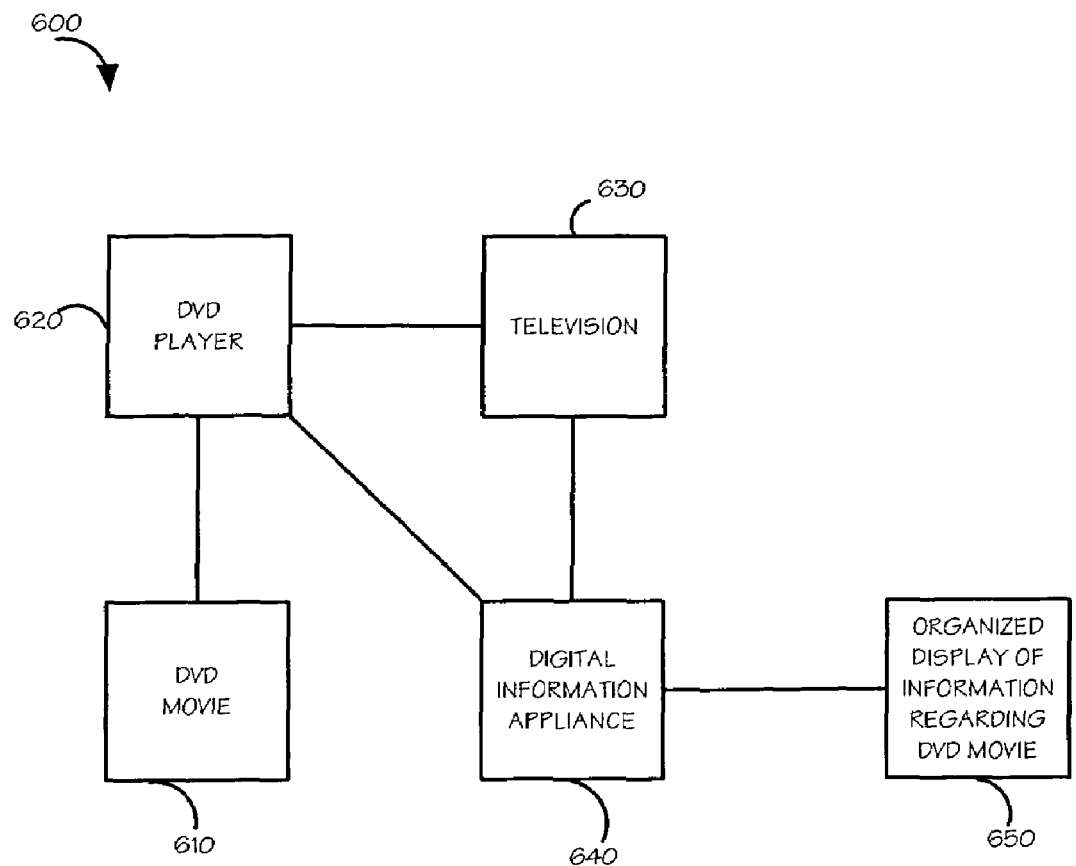
FIG. 6 is a block diagram representing exemplary components necessary to generate channels relating to the audiovisual media being delivered through a device on a network system.

Referring now to FIG. 6, in an exemplary embodiment of the present invention, the components of the present invention may obtain and display channels 600 relating to the audiovisual media being delivered on a device connected to a network as shown in block diagram form. For example, a DVD movie 610 may be viewed utilizing a DVD player 620. Both the DVD player 620 and a television 630 may be operably connected to an information appliance 640 that is capable of analyzing the DVD movie 610. While watching the movie or thereafter, the information appliance 640 may obtain and display information related to the DVD movie and create an audiovisual media sub-channel of a DVD device channel 650.

The present invention is not limited to just DVD movies. The present invention may produce channels relating to the artist or recording label or genre of various storage medium. Also, video games that are played on a video game device may cause the information appliance to generate content relating to the characters within the specific video games. Other types of activities enjoyed through devices which may be operably connected to a network and an information appliance of the present invention may also generate channels without user intervention without departing from the scope and spirit of the present invention.

Figure 7:
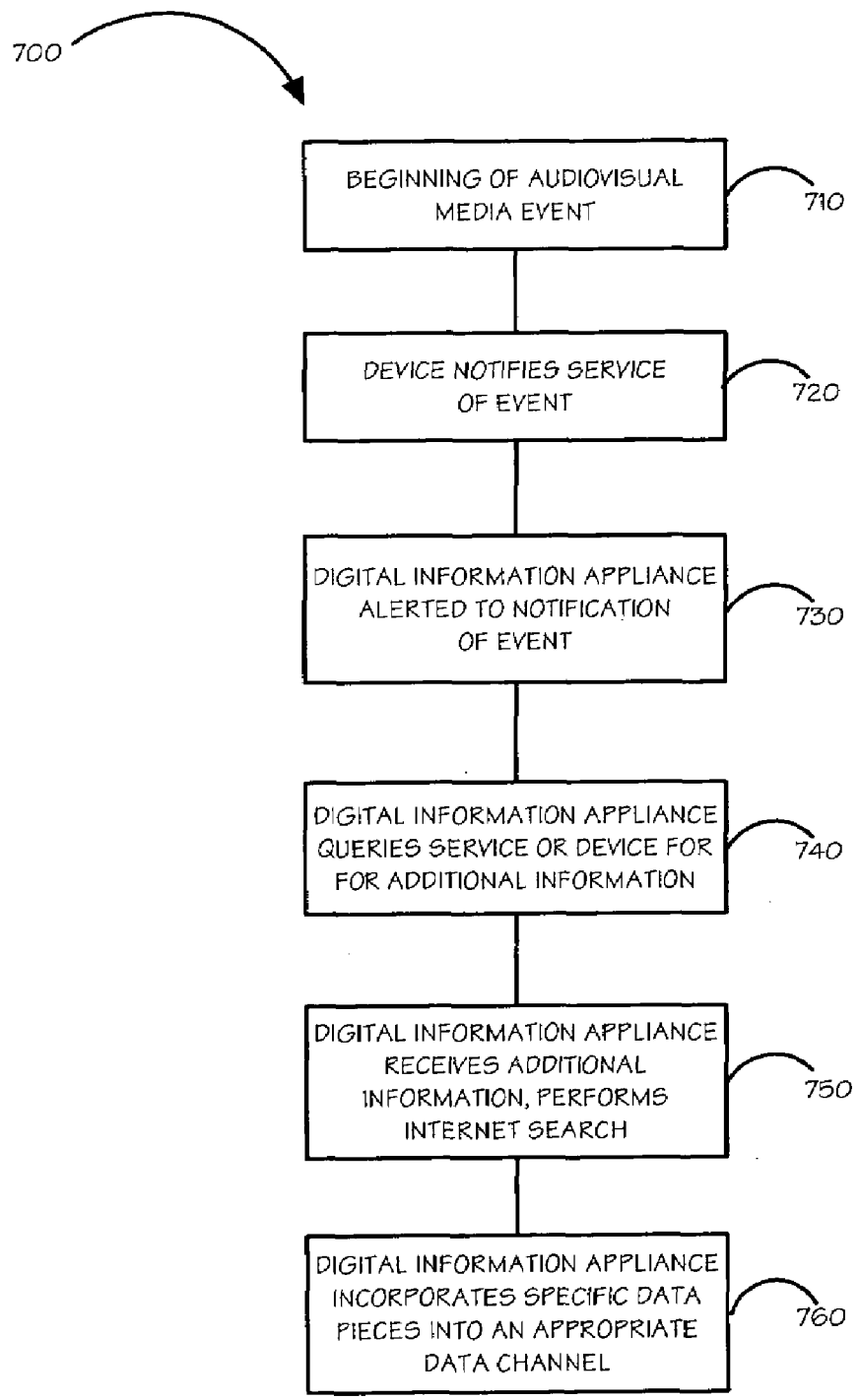
FIG. 7 is a flow chart representing a preferred procedure for producing channels relating to the audiovisual media being delivered through a device on a network system.

Referring now to FIG. 7, an exemplary process 700 of generating content based upon the audiovisual media being delivered by a device connected to a network is shown. The process may begin at the beginning of an audiovisual media event, step 710. An example of an event may be the placement of a DVD movie into a DVD player. After an event takes place, a device may notify a service interface of the event in step 720. The service interface may be a software controlled function, which basically monitors and reports events in relation to the specific device being utilized and the specific content being played or broadcast. The information appliance is then alerted to the notification of the event in step 730. When an event occurs on a device registered in the network, the system of the present invention will be able to associate the type of device from the information generated by the service interface.

Upon determination of the type of device, the information appliance may query the service interface, or the device directly, for additional information in step 740. When the information appliance 310 receives any additional information, additional predetermined steps, such as an Internet search for related information, may be performed by the information appliance 310 of the present invention in step 750. The information appliance may then incorporate specific data received during the Internet search and place them into an appropriate data channel 760.

Figure 8:
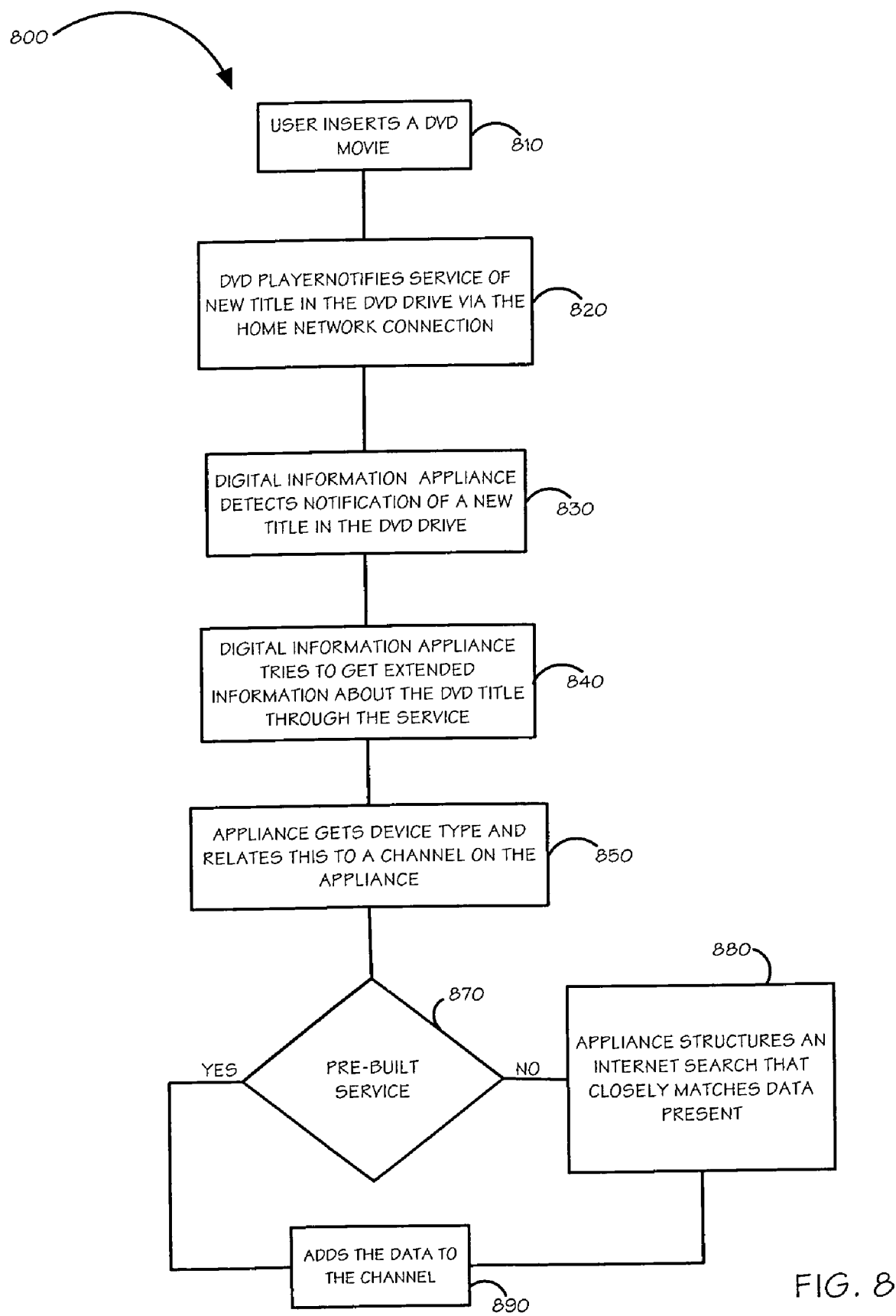
FIG. 8 depicts an exemplary process of generating channels relating to a DVD movie.

An example of the process of the present invention is shown in FIG. 8. Although in the example a DVD player is shown, this should not be considered limiting the scope of possible implementations. The process 800 may begin when a user inserts a DVD movie into a DVD player in step 810. The DVD player may notify service interface of a new title in the DVD drive via the network connection in step 820. Through communication with the service interface, the information appliance 310 may be notified of the new audiovisual media, namely, a new title in the DVD drive in step 830. The information appliance 310 may try to get extended information regarding the DVD title through the service interface in step 840.

When the information appliance determines the type of device, the information received by the appliance 310 may be related to the DVD channel on the appliance, as per step 850. It is possible to create pre-built services for each device, as per step 870. A pre-built service could be a questionnaire, a way to document the viewing of content, and the like. If the device comes with a pre-built service, the pre-built service is added to the DVD channel as a sub-channel in step 890. If a pre-built service does not exist in step 870, then the information appliance 310 may perform a predetermined step, such as executing an Internet search for related information which closely matches the data present, as per step 880. The data received from the Internet search is added to the appropriate sub-channel of the DVD channel in step 890.

For example, the user interface may have a DVD channel. The user watches a James Bond movie. Based upon prior user-defined preferences, this content is listed under the sub-channel for "action" movies. Under this "action movie" sub-channel are the sub-sub-channels that list the various movies previously viewed by the user. Thus, the latest viewing of a James Bond movie adds this new James Bond movie as a sub-sub-channel. Now, the system searches the DVD for related content or the Internet for related content, and then makes this related content available under the movie's sub-sub-channel as a "related information" sub-sub-sub-channel.

Generally referring to FIGS. 3–8, in an exemplary embodiment, the system 200 of the present invention monitors and responds to devices and activities that occur on devices and creates or updates channels associated with the devices. In an exemplary embodiment, the system 200 accomplishes the task of responding to activities which occur on a device by utilizing a service interface between the devices. In one embodiment, the service interface may be exposed through a Jini implementation or a HAVi implementation through a Jini-HAVi technology bridge. For example, in a Jini network, a Java interface may be exposed by the device. However, the present invention is not limited to a Jini implementation, as similar home-networking technology exists. Thus, other types of networks may be utilized without departing from the scope and spirit of the present invention.

Figure 9:
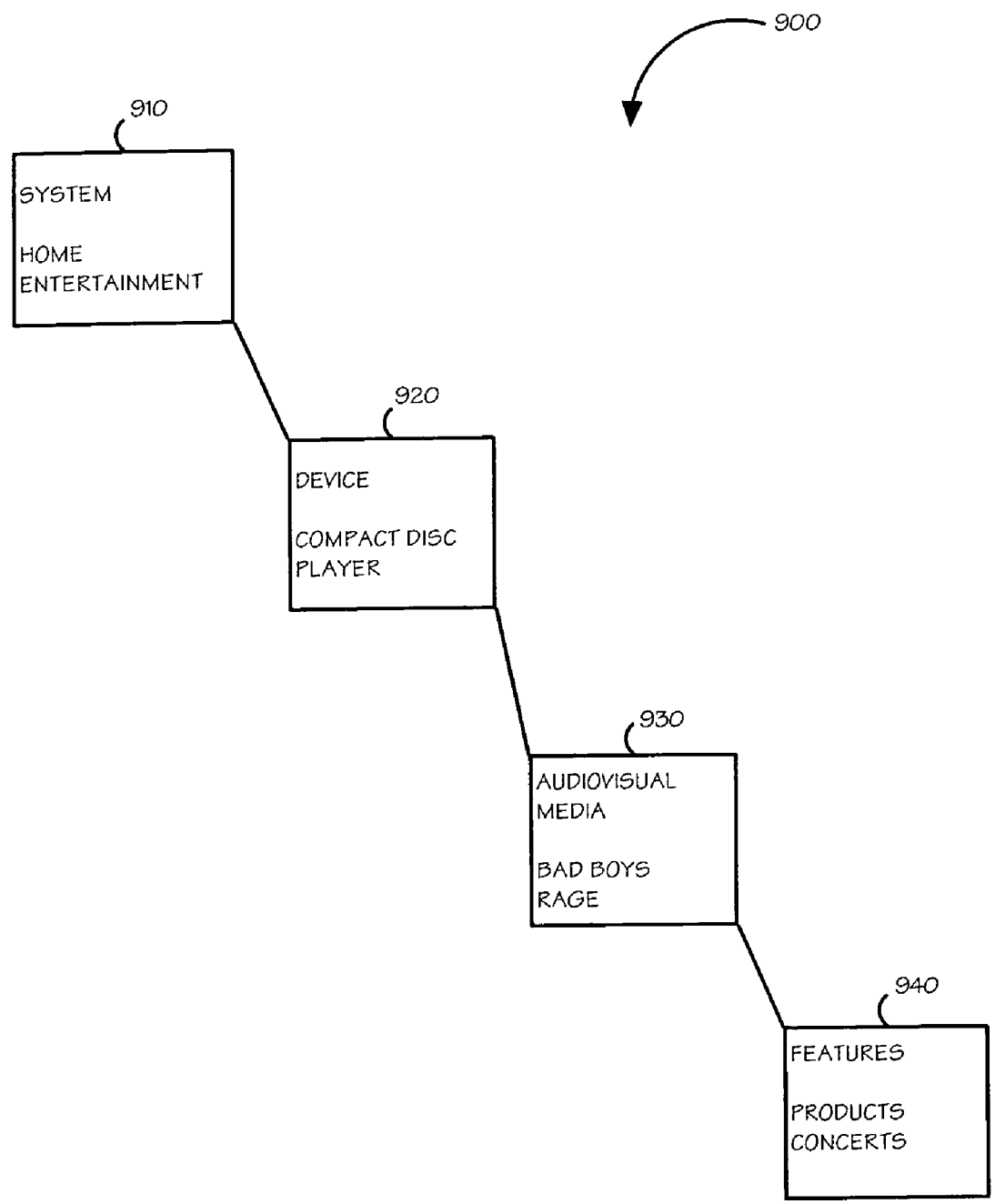
FIG. 9 depicts an exemplary organization of the content that may be generated by a preferred embodiment of the system of the present invention.

When network channels are created or enhanced, they may be organized in a variety of ways. In one embodiment, the content may be organized in a genus-species relationship from the system, to a device, to audiovisual media, and then to features or additional information related to the audiovisual media. This is shown in an exemplary fashion in FIG. 9. For example, in approach 900, the system 910, or home entertainment system, may be considered the genus. A device 920 of a home entertainment system 910 may be a CD player. The device 920 is a channel in the user interface for the system 910. The audiovisual media 930 of a CD player may be the various CDs stored in a jukebox-type CD player. Each CD is listed as a sub-channel to the CD Player Device channel. Features 940 is a sub-sub-channel of each CD in the sub-channel. For example, the "Bad Boys" sub-channel will have a sub-sub-channel that lists information relating to the group's concert schedule, which was automatically downloaded by the system via the Internet.

Additional devices would be listed as additional channels within the user interface for the system. This type of organization structure may be modified by the user to fit the user's preferences. The channels may be created and organized by type of audiovisual media, classification of the format, classification by producer, and the like.

Yet another advantage of the present invention is the ability to update the content that is generated through the present invention. Turning once again to the viewing of the James Bond movie example described earlier, suppose after viewing the James Bond movie, aggregates of content were generated through the utilization of the present invention. Then, a year after originally viewing the movie, the user watches the program again. The system of the present invention is capable of adding updated content to the subsub-channels which was not available when the movie was originally viewed, since the system has been programmed to search the Internet for updated information, and to check to see if the web sites found during the original viewing of the program are still viable. As a result, the channels generated through the utilization of the present invention will always be current such that the user will receive the latest available content.

Throughout the description of the present invention, the generation of channels may be one aspect of an exemplary embodiment of the present invention. Channels may include an organized aggregation of content that may be readily accessible to a user, content being any type of information. Further, use of the term channel is not limited to a specific type of content nor a specific organizational structure. Also, the generation of channels relating to audiovisual media includes but is not limited to audio, movies, television, photography, art, video games, music, and the Internet.

It is believed that the present invention and many of its attendant advantages will be understood by the foregoing description, and it will be apparent that various changes may be made in the form, construction, and arrangement of the devices thereof without departing from the scope and spirit of the invention or without sacrificing all of its material advantages. The form herein before described being merely an explanatory embodiment thereof, it is the intention of the following claims to encompass and include such changes.

What is claimed is:

1. A system comprising:
   (a) an information appliance having a graphical user interface and capable of retrieving content via a worldwide network; and
   (b) a first device capable of being operably connected with said information appliance, said first device comprises at least one of the following: a television, a cable box, a satellite receiver, a CD player, a DVD player, a radio tuner, a video game player, a VCR, and a security system; wherein said information appliance creates a device channel upon detection of said first device and analyzing an audiovisual media delivered by said first device and automatically creating a media sub-channel to said device channel in a format acceptable to a user, said device channel comprising information associated with said first device and content retrieved from said worldwide network relating to said first device, said media sub-channel comprising information associated with said audiovisual media and content retrieved from said worldwide network relating to said audiovisual media, said device channel and media sub-channel being accessible for display via said graphical user interface, said audiovisual media comprises at least one of the following: audio content, musical content, video content, photographical content, and a video game.

2. The system as claimed in claim 1, wherein said worldwide network is the Internet.

3. The system as claimed in claim 1, further comprising a second device capable of being operably connected to said information appliance.

4. The system as claimed in claim 3, wherein said graphical user interface comprises a second device channel for said second device.

5. The system as claimed in claim 1, wherein said device channel comprises an aggregation of content comprising at least one of the following: information regarding the manufacturer of said first device, products available for said first device, instructions for utilization of said first device, and information relating to activities occurring on said first device.

6. The system as claimed in claim 1, wherein said media sub-channel and said device channel are updated upon subsequent utilization of said first device.

7. The system as claimed in claim 1, wherein said information appliance is configured to create the device channel in response to detecting the initial presence of said first device.

8. The system as claimed in claim 7, wherein said information appliance is configured to create the media sub-channel in response to analyzing the audiovisual media delivered by said first device.

9. The system as claimed in claim 1, wherein the first device is configured to be capable of making a detection of an audiovisual media event and communicating the detection to the information appliance.

10. The system as claimed in claim 9, wherein said information appliance is capable of analyzing the audiovisual media delivered by said first device and automatically creating the media sub-channel in response to the detection of the audiovisual media event.

11. The system as claimed in claim 9, wherein the audiovisual media event comprises placement of the audiovisual media into the first device.

12. A method of automatically generating channels, comprising the steps of:
   (a) configuring an information appliance suitable for searching a worldwide network;
   (b) formatting said information appliance to include a graphical user interface;
   (c) detecting a connection of a first device to said information appliance;
   (d) creating a device channel upon detection of said first device;
   (e) analyzing audiovisual usage on said device; and
   (f) searching said worldwide network for information associated with said first device and an audiovisual media delivered by said first device, said first device comprises at least one of the following: a television, a cable box, a satellite receiver, a CD player, a DVD player, a radio tuner, a video game player, a VCR, and a security system; wherein said information appliance automatically places information associated with audiovisual media delivered by said first device and content retrieved from said worldwide network relating to said audiovisual media into a media sub-channel of said device channel acceptable to a user for display via said graphical user interface, said media sub-channel including additional sub-channels, each of said additional sub-channels containing information related to said media sub-channel, said audiovisual media comprises at least one of audio, video, music, a video game, and photography.

13. The method as claimed in claim 12, wherein said worldwide network is the Internet.

14. The method as claimed in claim 12, further comprising a second device capable of being operably connected to said information appliance.

15. The method as claimed in claim 14, wherein said graphical user interface comprises a second device channel for said second device.

16. The method as claimed in claim 12, wherein said device channel comprises an aggregation of content comprising at least one of the following: information regarding the manufacturer of said first device, products available for said first device, instructions for utilization of said first device, and information relating to activities occurring on said first device.

17. The method as claimed in claim 12, wherein said media sub-channel and said device channel are updated upon subsequent utilization of said first device.

18. The method as claimed in claim 12, further comprising creating the device channel in response to detecting the initial presence of said first device.

19. The method as claimed in claim 18, further comprising creating the media sub-channel in response to analyzing the audiovisual media delivered by said first device.

20. The method as claimed in claim 12, wherein the first device is configured to be capable of making a detection of an audiovisual media event and communicating the detection to the information appliance.

21. The method as claimed in claim 20, wherein said information appliance is capable of analyzing the audiovisual media delivered by said first device and automatically creating the media sub-channel in response to the detection of the audiovisual media event.

22. The method as claimed in claim 20, wherein the audiovisual media event comprises placement of the audiovisual media into the first device.

23. A program of instructions storable on a medium readable by an information appliance capable of enabling the information appliance to execute steps for generating a plurality of channels, the steps comprising:
  (a) analyzing an audiovisual media delivered by a first device operably connected to an information appliance, said first device comprises at least one of the following: a television, a cable box, a satellite receiver, a CD player, a DVD player, a radio tuner, a video game player, a VCR, and a security system;
  (b) searching a worldwide network for information associated with said first device and audiovisual media delivered by said first device;
  (c) creating a graphical user interface; and
  (d) organizing information associated with said device and content retrieved from said worldwide network into a device channel, and further organizing audiovisual media and content retrieved from said worldwide network relating to said audiovisual media into a media sub-channel of said device channel in a format acceptable to a user for display via said graphical user interface, said media sub-channel including links to web sites which relate to said audiovisual media, wherein said audiovisual media comprises at least one of audio, video, music, video games, and photography.

24. The program of instructions as claimed in claim 23, wherein said worldwide network is the Internet.

25. The program of instructions as claimed in claim 23, further comprising a second device capable of being operably connected to said information appliance.

26. The program of instructions as claimed in claim 25, wherein said graphical user interface comprises a second device channel for said second device.

27. The program of instructions as claimed in claim 23, wherein said device channel comprises an aggregation of content comprising at least one of the following: information regarding the manufacturer of said first device, products available for said first device, instructions for utilization of said first device, and information relating to activities occurring on said first device.

28. The program of instructions as claimed in claim 23, wherein said media sub-channel and said first device channel are updated upon subsequent utilization of said first device.

29. The program of instructions as claimed in claim 23, wherein the first device is configured to be capable of making a detection of an audiovisual media event and communicating the detection to the information appliance.

30. The program of instructions as claimed in claim 29, wherein said information appliance is capable of analyzing the audiovisual media delivered by said first device and automatically creating the media sub-channel in response to the detection of the audiovisual media event.

31. The program of instructions as claimed in claim 29, wherein the audiovisual media event comprises placement of the audiovisual media into the first device.

* * * * *